(12) United States Patent
Choi et al.

(10) Patent No.: US 9,066,408 B2
(45) Date of Patent: Jun. 23, 2015

(54) ORGANIC LIGHT EMITTING DISPLAY DEVICE AND METHOD OF TESTING THE SAME

(71) Applicants: SAMSUNG DISPLAY CO., LTD., Yongin, Gyeonggi-do (KR); NEXTIN, INC., Seongnam-si, Gyeonggi-do (KR)

(72) Inventors: Young Woo Choi, Cheonan-si (KR); Kwangsae Lee, Cheonan-si (KR)

(73) Assignee: Samsung Display SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/925,710

(22) Filed: Jun. 24, 2013

(65) Prior Publication Data
US 2014/0197744 A1    Jul. 17, 2014

(30) Foreign Application Priority Data
Jan. 15, 2013   (KR) .................. 10-2013-0004528

(51) Int. Cl.
  *G09G 3/30*   (2006.01)
  *H05B 33/08*  (2006.01)
  *G09G 3/00*   (2006.01)
  *G09G 3/32*   (2006.01)

(52) U.S. Cl.
  CPC ............ *H05B 33/0896* (2013.01); *G09G 3/006* (2013.01); *G09G 3/3233* (2013.01); *G09G 2300/0861* (2013.01)

(58) Field of Classification Search
  USPC .................... 345/76–104, 204–215, 690
  See application file for complete search history.

(56) References Cited

U.S. PATENT DOCUMENTS

| | | | |
|---|---|---|---|
| 7,312,624 B2* | 12/2007 | Ishii .................... | 324/760.02 |
| 2005/0001794 A1* | 1/2005 | Nakanishi et al. ........ | 345/76 |
| 2006/0079010 A1* | 4/2006 | Hara et al. ............. | 438/14 |
| 2007/0296672 A1* | 12/2007 | Kim et al. .............. | 345/92 |
| 2012/0001950 A1* | 1/2012 | Kim .................... | 345/690 |
| 2012/0326744 A1* | 12/2012 | Tajika et al. ........... | 324/762.01 |

FOREIGN PATENT DOCUMENTS

| KR | 10-2007-0110745 A | 11/2007 |
|---|---|---|
| KR | 10-2010-0008126 A | 1/2010 |

* cited by examiner

*Primary Examiner* — Tung X Le
(74) *Attorney, Agent, or Firm* — Christie, Parker & Hale LLP (57) ABSTRACT

Provided is an organic light emitting display device including: a display unit including a plurality of pixels, each pixel of the pixels including an organic light emitting diode; and a test circuit configured to apply a first signal and a second signal to the display unit and to receive a third signal from the display unit. The test circuit is configured to determine whether or not the display unit is in a normal state based on a voltage level of the third signal when the first and second signals have a first level.

9 Claims, 5 Drawing Sheets

ORGANIC LIGHT EMITTING DISPLAY DEVICE AND METHOD OF TESTING THE SAME

CROSS-REFERENCE TO RELATED APPLICATION

This application claims priority under 35 U.S.C. §119 to and the benefit of Korean Patent Application No. 10-2013-0004528, filed on Jan. 15, 2013, in the Korean Intellectual Property Office (KIPO), the contents of which are incorporated by reference herein in its entirety.

BACKGROUND

1. Field

The present disclosure relates to an organic light emitting display device and a method of testing the organic light emitting display device.

2. Description of the Related Art

In recent years, various flat panel display devices have been developed, which have a lightweight and a slim size compared to a cathode ray tube. In particular, light emitting display devices having aspects such as superior light emitting efficiency, high brightness, wide viewing angle, fast response speed, etc., have been spotlighted.

As one of the light emitting display devices, an organic light emitting display device has been spotlighted as a next generation display device because it has properties such as fast response speed, low driving voltage, thin thickness, wide viewing angle, etc. Additionally, light emitting display devices are a self-emissive display device that electrically excites a fluorescent organic compound to emit light.

The organic light emitting display device includes a plurality of pixels. Each pixel includes a line part having a gate line, a data line, and a driving voltage line, a switching transistor coupled to the line part, an organic light emitting device coupled to the switching transistor, and a capacitor coupled to the switching transistor. The switching transistor is turned on or off in accordance with a signal provided through the line part and a current flows through the organic light emitting device when the switching transistor is turned on. In a case that defects exist in the switching transistor of the pixel, the pixel may malfunction.

SUMMARY

The present disclosure provides an organic light emitting display device capable of inspecting defects of a pixel.

The present disclosure provides a method of testing the organic light emitting display device in order to inspect defects of the pixel.

Embodiments of the inventive concept provide an organic light emitting display device including a display unit including a plurality of pixels, each pixel of the pixels including an organic light emitting diode; and a test circuit configured to apply a first signal and a second signal to the display unit and to receive a third signal from the display unit, wherein the test circuit is configured to determine whether or not the display unit is in a normal state based on a voltage level of the third signal when the first and second signals have a first level.

Each of the pixels may further include a first transistor including a gate electrode coupled to a first node, the first transistor being coupled between a second node and a third node; a second transistor including a gate electrode configured to receive the first signal, the second transistor being coupled between a data line and the second node; a third transistor including a gate electrode configured to receive the first signal, the third transistor being coupled between the first node and the third node; a fourth transistor including a gate electrode configured to receive the first signal applied to a previous pixel of the pixels, the fourth transistor being coupled between the first node and an initialization voltage; a fifth transistor including a gate electrode configured to receive the second signal, the fifth transistor being coupled between a source voltage and the second node; and a sixth transistor including a gate electrode configured to receive the second signal, sixth transistor being coupled between the third node and a fourth node, wherein the organic light emitting diode is coupled between the fourth node and a ground voltage source.

The test circuit may be configured to determine whether or not the fifth transistor is in a normal state based on the voltage level of the third signal through the data line when the first and second signals have the first level.

The test circuit is configured to determine whether or not the fifth transistor is in the normal state based on the third signal being in the low level while the first and second signals are applied and the second and fifth transistors are turned on.

Each of the pixels may further include a first capacitor coupled between the source voltage and the first node and a capacitor coupled between the gate electrode of the second transistor and the first node.

The first signal may be supplied through a gate line and the second signal may be supplied through a light emitting control line.

Embodiments of the inventive concept provide a method of testing an organic light emitting display device, the method including: applying a first signal and a second signal to a display unit, wherein the display unit includes a plurality of pixels each having an organic light emitting diode; receiving a third signal from the display unit; and determining whether or not the display unit is in a normal state based on a voltage level of the third signal when the first and second signals have a first level.

Each of the pixels may further include: a first transistor including a gate electrode coupled to a first node, the first transistor being coupled between a second node and a third node; a second transistor including a gate electrode coupled to the first signal, the second transistor being coupled between a data line and the second node; a third transistor including a gate electrode coupled to the first signal, the third transistor being coupled between the first node and the third node; a fourth transistor including a gate electrode coupled to the first signal applied to a previous pixel of the pixels, the fourth transistor being coupled between the first node and an initialization voltage; a fifth transistor including a gate electrode coupled to the second signal, the fifth transistor being coupled between a source voltage and the second node; and a sixth transistor including a gate electrode coupled to the second signal, the sixth transistor being coupled between the third node and a fourth node, and the organic light emitting diode being coupled between the fourth node and a ground voltage source.

Determining whether or not the display unit is in the normal state may include determining whether or not the fifth transistor is in a normal state based on the voltage level of the third signal provided through the data line when the first and second signals have the first level.

Determining whether or not the display unit is in the normal state may include determining whether or not the fifth transistor is in the normal state based on the third signal being in the low level while the first and second signals are applied and the second and fifth transistors are turned on.

The first signal may be supplied through a gate line and the second signal may be supplied through a light emitting control line.

According to the above, the defects in the transistors of the pixels may be determined while the organic light emitting display device is being manufactured.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

Figure 1:
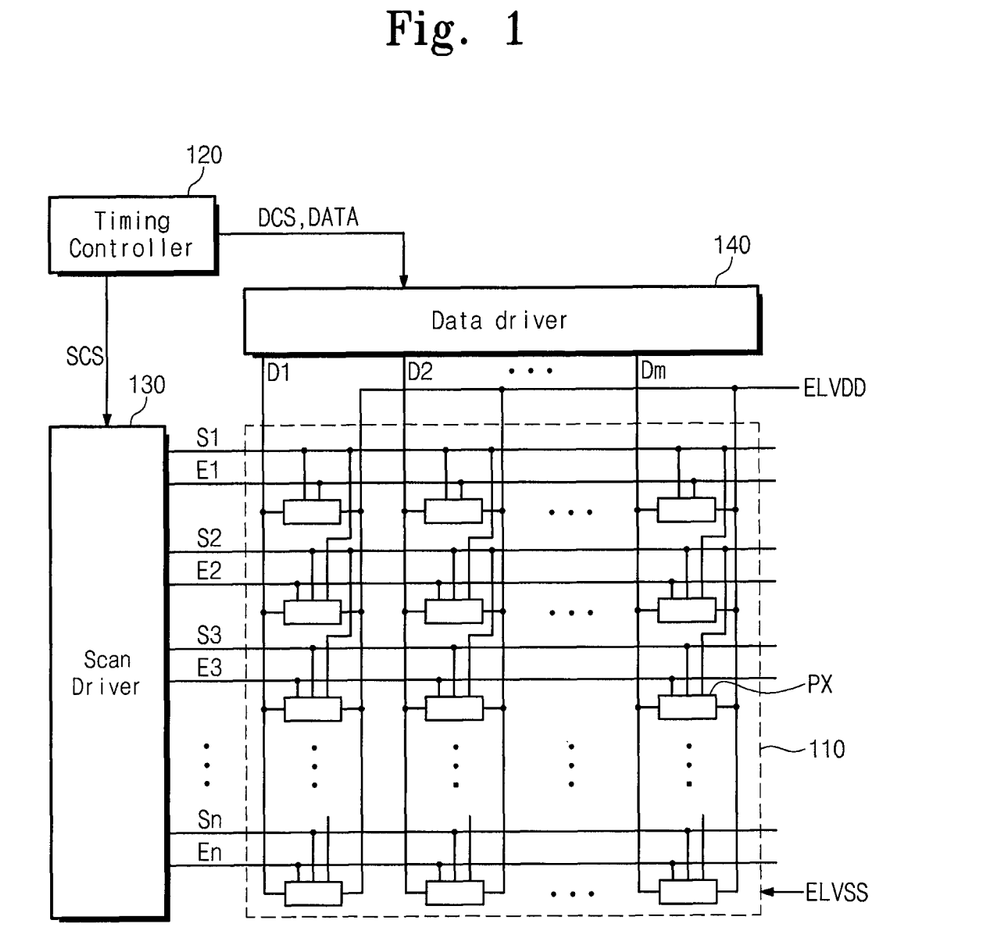
FIG. 1 is a schematic view showing an organic light emitting display device according to an exemplary embodiment of the present disclosure.

FIG. 1 is a schematic view showing an organic light emitting display device according to an exemplary embodiment of the present disclosure.

Referring to FIG. 1, the organic light emitting display device 100 includes a display unit 110, a timing controller 120, a scan driver 130, and a data driver 140. The display unit 110 includes a plurality of pixels PX arranged in areas defined by a plurality of scan lines S1 to Sn, a plurality of light emitting control lines E1 to En, and a plurality of data lines D1 to Dm.

The timing controller 120 applies a scan driving control signal SCS to the scan driver 130 and applies a data driving control signal DCS and image data DATA to the data driver 140 in response to synchronization signals and an image signal, which are provided from an external source (not shown).

The scan driver 130 applies scan signals to the scan lines S1 to Sn in response to the scan driving control signal SCS from the timing controller 120 and applies light emitting control signals to the light emitting control lines E1 to En.

In the present exemplary embodiment, the scan driver 130 sequentially applies the scan signals to the scan lines S1 to Sn such that the pixels PX coupled to the scan lines S1 to Sn are sequentially driven. In addition, the scan driver 130 applies the light emitting control line Ej substantially in parallel to a present scan line Sj while the scan signal is applied to a previous scan line Sj−1, and thus transistors in the pixels PX are turned on. In this case, j is a natural number.

Then, the scan driver 130 applies the light emitting control signal to the light emitting control line Ej to allow the transistors in the pixel PX to be turned off from a second period following a first period in a time period, in which a previous scan signal is applied to the previous scan line, to a third period in which a present scan signal is applied to the present san line.

Meanwhile, for the convenience of explanation, one scan driver 130 generates and outputs the scan signals and the light emitting control signals in FIG. 1, but it should not be limited thereto or thereby.

That is, the scan driver 130 may be provided in a plural number. In such a case, the plurality of scan drivers may be disposed at opposing sides of the display unit 110 to apply the scan signals and the light emitting control signals. Alternatively, a driving circuit that generates and outputs the scan signals and a driving circuit that generates and outputs the light emitting control signals may be distinct from each other and referred to as the scan driver and the light emitting control driver, respectively. The scan driver and the light emitting control driver may be disposed at the same side or different (e.g., opposite) sides of the display unit 110.

The data driver 140 receives the data driving control signal DCS and the image data DATA from the timing controller 120 and drives the data lines D1 to Dm.

The display unit 110 receives a first source voltage ELVDD and a second source voltage ELVSS from an external source (not shown) and generates light corresponding to the data signals provided through the data lines D1 to Dm. In addition, the display unit 110 may further receive an initialization voltage VINT in accordance with the structure of the pixels PX.

Each pixel PX of the display unit 110 includes an organic light emitting diode. Each pixel PX includes one or more transistors to selectively provide a current to the organic light emitting diode. According to the present exemplary embodiment, the transistors in the pixels PX may be tested to determine whether or not the transistors are operating normally (e.g., functioning properly) when the organic light emitting display device 100 is manufactured after the transistors are formed and coupled to the scan lines S1 to Sn and the light emitting control lines E1 to En.

Figure 2:
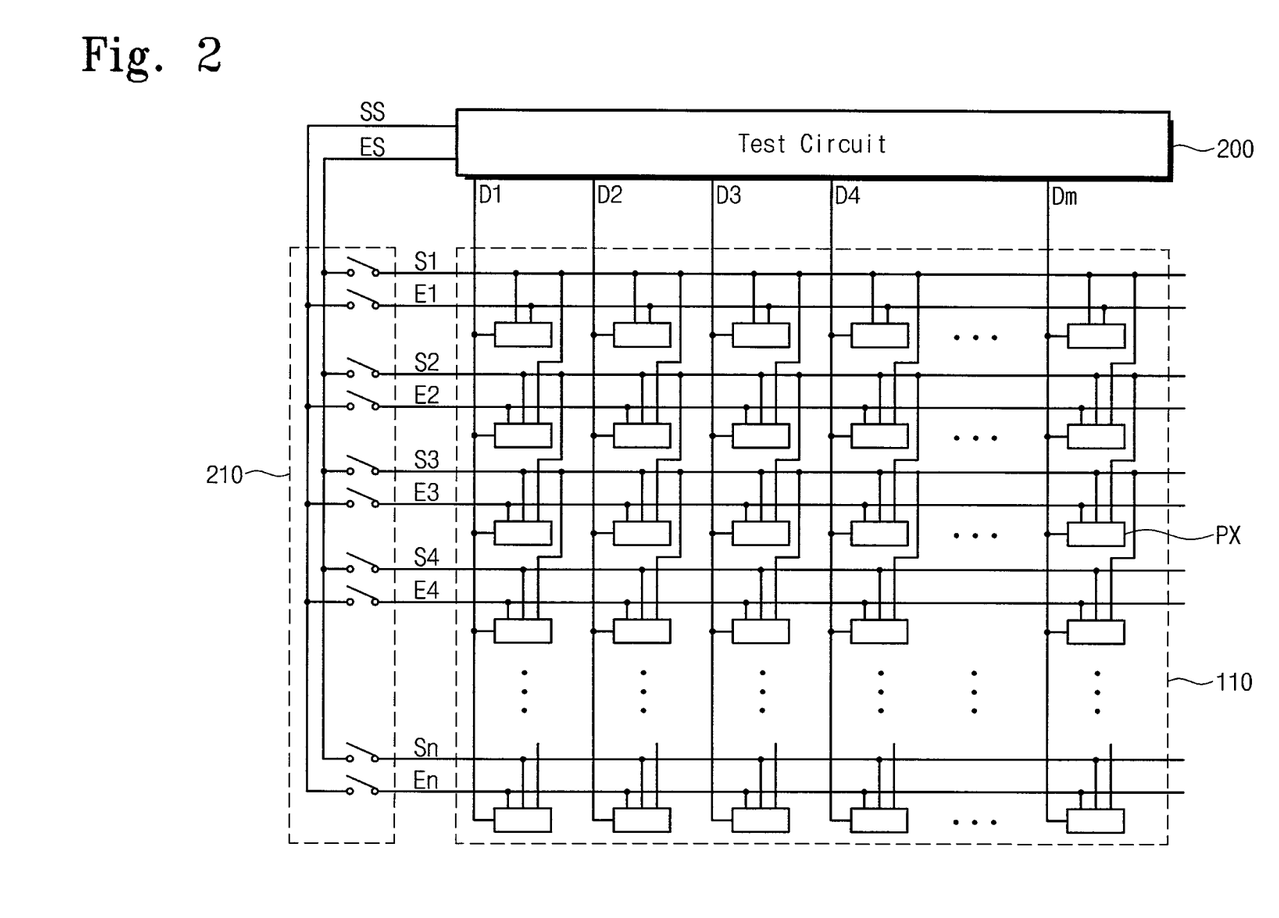
FIG. 2 is a schematic view showing a test circuit coupled to the display unit shown in FIG. 1 to test the display unit.

FIG. 2 is a schematic view of a test circuit coupled to the display unit shown in FIG. 1 to test the display unit.

Referring to FIG. 2, a test circuit 200 is coupled to the display unit 110 through a switching part 210. The switching part 210 includes a plurality of switches to couple the test circuit 200 to the scan lines S1 to Sn and the light emitting control lines E1 to En. The switching part 210 sequentially couples the scan lines S1 to Sn and the light emitting control lines E1 to En to the test circuit 200 during a test mode.

The test circuit 200 applies the scan signals SS and the light emitting control signals ES to the scan lines S1 to Sn and the light emitting control lines E1 to En through the switching part 210, respectively, and determines whether or not the pixels PX of the display unit 110 are operating normally (e.g., functioning properly) on the basis of signals provided through the data lines D1 to Dm.

Figure 3:
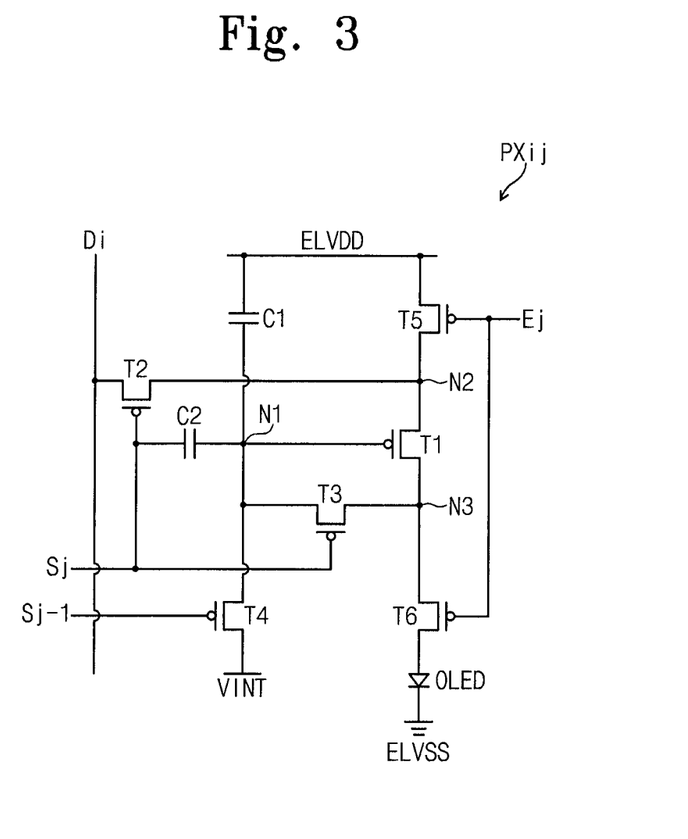
FIG. 3 is a schematic circuit diagram showing one of the pixels shown in FIG. 2.

FIG. 3 is a schematic circuit diagram of one of the pixels PX shown in FIG. 2. In detail, FIG. 3 shows the pixel PXij coupled to an i-th data line Di (i is a positive integer) and a j-th horizontal line (j is a positive integer) as a representative example.

Referring to FIG. 3, the pixel PXij includes first, second, third, fourth, fifth, and sixth transistors T1, T2, T3, T4, T5, and T6, respectively, a first capacitor C1, a second capacitor C2, and an organic light emitting diode OLED.

The first transistor T1 is coupled between a second node N2 and a third node N3 and includes a control (or gate) electrode coupled to a first node. The second transistor T2 is coupled between the data line Di and the second node N2 and includes a gate electrode coupled to the scan line Sj, with the gate electrode of the second transistor T2 being configured to receive the scan signal supplied by the scan line Sj.

The third transistor T3 is coupled between the first node N1 and the third node N3 and includes a gate electrode coupled to the scan line Sj, with the gate electrode of the third transistor T3 being configured to receive the scan signal supplied by the scan line Sj.

The fourth transistor T4 is coupled between the first node and the voltage source supplying the initialization voltage VINT and includes a gate electrode coupled to a scan line Sj−1, with the gate electrode of the fourth transistor T4 being configured to receive the scan signal supplied by the scan line Sj−1 corresponding to a previous pixel.

The fifth transistor T5 is coupled between the first source voltage ELVDD and the second node N2 and includes a gate electrode coupled to the light emitting control line Ej, with the gate electrode of the fifth transistor T5 being configured to receive the emission control signal supplied by the light emitting control line Ej.

The sixth transistor T6 is coupled between the third node N3 and a fourth node N4 and includes a gate electrode coupled to the light emitting control line Ej, with the gate electrode of the sixth transistor T6 being configured to receive the emission control signal supplied by the light emitting control line Ej.

The organic light emitting diode OLED is coupled between the fourth node N4 and the second source voltage ELVSS (or a ground voltage source).

The first capacitor C1 is coupled between the first source voltage ELVDD and the first node N1. The second capacitor C2 is coupled between the scan line Sj and the first node N1.

When the scan signal in a low level is applied to the scan line Sj of the pixel Pxij, the second transistor T2 is turned on. The data signal provided through the data line Di is applied to the organic light emitting diode OLED through the first and sixth transistors T1 and T6 while the second transistor T2 is turned on. In addition, when the scan signal in the low level is applied to the scan line Sj, the third transistor T3 is turned on to allow the first transistor T1 to perform a diode-connected operation.

The sixth transistor T6 is turned on or off in accordance with the level of the light emitting control signal ES provided through the light emitting control line Ej to form a current path through the organic light emitting diode OLED in the pixel PXij or to prevent the current path from being formed.

The fourth transistor T4 is turned on when the previous scan signal is provided through the previous scan line Sj−1, and thus the first node N1 is initialized to the initialization voltage VINT.

The fifth transistor T5 is turned on or off in accordance with the level of the light emitting control signal provided through the light emitting control line Ej to form a current path through the organic light emitting diode OLED in the pixel PXij or to prevent the current path from being formed.

Figure 4:
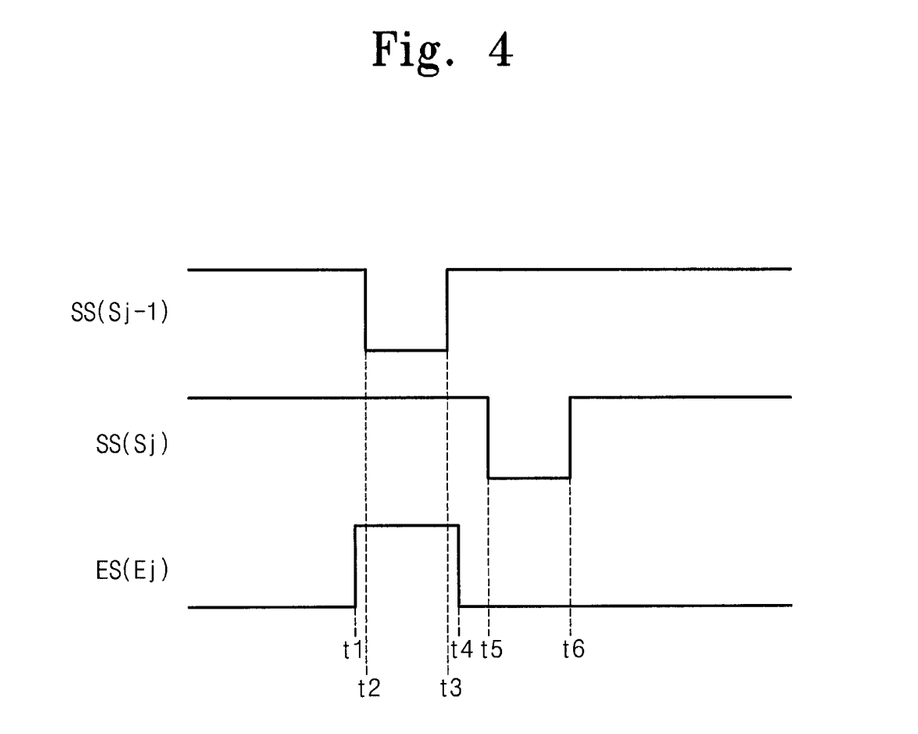
FIG. 4 is a timing diagram showing signals used to test the pixel shown in FIG. 3.

FIG. 4 is a timing diagram showing signals used to test the pixel shown in FIG. 3. FIG. 4 shows the scan signal SS applied to the previous scan line Sj−1 and the j-th scan line Sj and the light emitting control signal ES.

Referring to FIGS. 2, 3, and 4, the test circuit 200 applies the scan signal SS and the light emitting control signal ES to the scan line Sj and the light emitting control line Ej, respectively, to test the display unit 110.

The light emitting control signal ES transitions from a low level to a high level at a first time point t1. When the light emitting control signal ES provided through the light emitting control line Ej transitions to the high level, the fifth transistor T5 and the sixth transistor T6 are turned off.

The previous scan signal SS applied to the previous scan line Sj−1 transitions from a high level to a low level at a second time point t2. When the previous scan signal SS applied to the previous scan line Sj−1 transitions to the low level, the fourth transistor T4 is turned on and the voltage of the first node N1 is set to the initialization voltage VINT.

The previous scan signal SS applied to the previous scan line Sj−1 transitions from the low level to the high level at a third time point t3 and the light emitting control signal ES applied to the light emitting control line Ej transitions from the high level to the low level at a fourth time point t4. Therefore, the fourth transistor T4 is turned off and the fifth and sixth transistors T5 and T6 are turned on.

The scan signal SS applied to the scan line Sj transitions to the low level at a fifth time point t5. When the scan signal SS applied to the scan line Sj transitions to the low level, the second transistor T2 and the third transistor T3 are turned on.

In the case that the initialization voltage VINT is set to the voltage level, at which the first transistor T1 is turned off, in the test mode, the current path is formed between the first source voltage ELVDD and the data line Di through the fifth transistor T5 and the second transistor T2 when the fifth transistor T5 is operated normally. Therefore, the test circuit 200 shown in FIG. 2 determines that the fifth transistor T5 is operating normally (or functioning properly) when the signal in the high level is applied to the data line Di between the fifth time point t5 and the sixth time point t6 in which the scan signal SS and the light emitting control signal ES are maintained in the low level.

In the case that the fifth transistor T5 is operating abnormally (e.g., not functioning properly) due to the defects on the fifth transistor T5, the signal in the high level is not applied to the data line Di between the fifth time point t5 and the sixth time point t6 in which the scan signal SS and the light emitting control signal ES are maintained in the low level. In this case, the test circuit 200 determines that the fifth transistor T5 is operating abnormally (e.g., not functioning properly).

Figure 5:
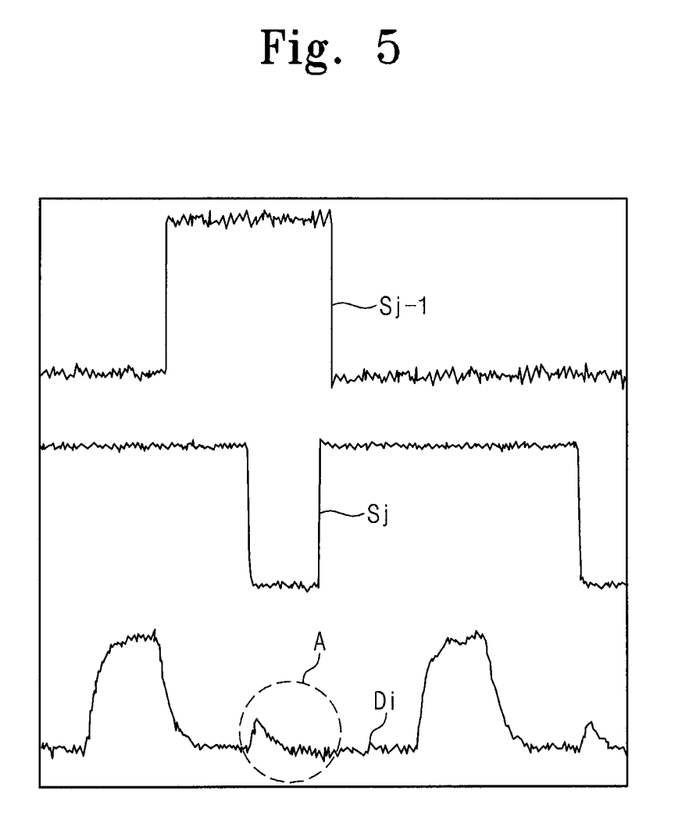
FIG. 5 is a view showing a test result obtained by determining whether or not the pixel shown in FIG. 3 is operated normally.

FIG. 5 is a view showing a test result obtained by determining whether or not the pixel shown in FIG. 3 is operated normally.

Referring to FIG. 5, when the previous scan signal SS applied to the previous scan line Sj−1 has the high level and the scan signal SS applied to the scan line Sj has the low level during the test mode, the signal in the high level may be detected from the data line Di. However, when the defects exist on the fifth transistor T5, the signal applied to the data line Di has the low level during a period A in which the scan signal SS applied to the scan line Sj has the low level. Accordingly, the test circuit 200 shown in FIG. 2 determines that the fifth transistor T5 is in the abnormal state based on the signal applied to the data line Di having the low level.

As described above, the defects of the display unit 110 may be relatively easily detected by performing the test process on a mother substrate on which the display unit 110 is formed. In addition, because the defects of the display unit 110 are determined before the display unit 110 is coupled to the scan driver 130 and the data driver 140 shown in FIG. 1, a manufacturing cost of the organic light emitting display device 100 may be reduced.

Although the exemplary embodiments of the present invention have been described, it is understood that the present invention should not be limited to these exemplary embodiments but various changes and modifications can be made by those having ordinary skill in the art within the spirit and scope of the appended claims, and their equivalents.

What is claimed is:

1. An organic light emitting display device comprising:
a display unit comprising a plurality of pixels, each of the pixels comprising an organic light emitting diode and a pixel circuit corresponding to the organic light emitting diode; and
a test circuit configured to apply a first signal and a second signal to a same pixel circuit of the pixel circuits of the display unit and to receive a third signal from the same pixel circuit of the pixel circuits of the display unit, wherein the test circuit is configured to determine whether or not the display unit is in a normal state based on a voltage level of the third signal when the first and second signals have a first level,
wherein each of the pixels further comprises:
a first transistor comprising a gate electrode coupled to a first node, the first transistor being coupled between a second node and a third node;
a second transistor comprising a gate electrode configured to receive the first signal, the second transistor being coupled between a data line and the second node;
a third transistor comprising a gate electrode configured to receive the first signal, the third transistor being coupled between the first node and the third node;
a fourth transistor comprising a gate electrode configured to receive the first signal applied to a previous pixel of the pixels, the fourth transistor being coupled between the first node and an initialization voltage;
a fifth transistor including a gate electrode configured to receive the second signal, the fifth transistor being coupled between a source voltage and the second node; and
a sixth transistor including a gate electrode configured to receive the second signal, sixth transistor being coupled between the third node and a fourth node;
wherein the organic light emitting diode is coupled between the fourth node and a ground voltage source.

2. The organic light emitting display device of claim 1, wherein the test circuit is configured to determine whether or not the fifth transistor is in a normal state based on the voltage level of the third signal through the data line when the first and second signals have the first level.

3. The organic light emitting display device of claim 2, wherein the test circuit is configured to determine whether or not the fifth transistor is in the normal state based on the third signal being in a low level while the first and second signals are applied and the second and fifth transistors are turned on.

4. The organic light emitting display device of claim 1, wherein each of the pixels further comprises:

a first capacitor coupled between the source voltage and the first node; and
a capacitor coupled between the gate electrode of the second transistor and the first node.

5. The organic light emitting display device of claim 1, wherein the first signal is supplied through a gate line and the second signal is supplied through a light emitting control line.

6. A method of testing an organic light emitting display device, the organic light emitting display device comprising:
a display unit comprising a plurality of pixels each having an organic light emitting diode and a pixel circuit corresponding to the organic light emitting diode,
the method comprising:
applying a first signal and a second signal to a same pixel circuit of the pixel circuits of the display unit;
receiving a third signal from the same pixel circuit of the pixel circuits of the display unit; and
determining whether or not the display unit is in a normal state based on a voltage level of the third signal when the first and second signals have a first level,
wherein each of the pixels further comprises:
a first transistor comprising a gate electrode coupled to a first node, the first transistor being coupled between a second node and a third node;
a second transistor comprising a gate electrode coupled to the first signal, the second transistor being coupled between a data line and the second node;
a third transistor comprising a gate electrode coupled to the first signal, the third transistor being coupled between the first node and the third node;
a fourth transistor comprising a gate electrode coupled to the first signal applied to a previous pixel of the pixels, the fourth transistor being coupled between the first node and an initialization voltage;
a fifth transistor comprising a gate electrode coupled to the second signal, the fifth transistor being coupled between a source voltage and the second node; and
a sixth transistor comprising a gate electrode coupled to the second signal, the sixth transistor being coupled between the third node and a fourth node, and the organic light emitting diode being coupled between the fourth node and a ground voltage source.

7. The method of claim 6, wherein determining whether or not the display unit is in the normal state further comprises determining whether or not the fifth transistor is in a normal state based on the voltage level of the third signal provided through the data line when the first and second signals have the first level.

8. The method of claim 6, wherein determining whether or not the display unit is in the normal state further comprises determining whether or not the fifth transistor is in the normal state based on the third signal being in a low level while the first and second signals are applied and the second and fifth transistors being turned on.

9. The method of claim 8, wherein the first signal is supplied through a gate line and the second signal is supplied through a light emitting control line.

* * * * *

UNITED STATES PATENT AND TRADEMARK OFFICE
CERTIFICATE OF CORRECTION

PATENT NO.         : 9,066,408 B2                                      Page 1 of 1
APPLICATION NO.    : 13/925710
DATED              : June 23, 2015
INVENTOR(S)        : Young Woo Choi et al.

It is certified that error appears in the above-identified patent and that said Letters Patent is hereby corrected as shown below:

In the Claims

Column 7, Claim 1, line 44        Delete "fourth node;"
                                  Insert -- fourth node, --

Column 7, Claim 1, line 45        After "signal,"
                                  Insert -- the --

Signed and Sealed this
Twelfth Day of April, 2016

Michelle K. Lee
*Director of the United States Patent and Trademark Office*